(12) United States Patent
Dankers et al.

(10) Patent No.: US 11,946,732 B2
(45) Date of Patent: Apr. 2, 2024

(54) METHODS OF WRAPPING OPTICAL FIBER AROUND A FLUID CONDUIT

(71) Applicant: Hifi Engineering Inc., Calgary (CA)

(72) Inventors: Arne Dankers, Calgary (CA); Seyed Ehsan Jalilian, Calgary (CA)

(73) Assignee: HIFI ENGINEERING INC., Calgary (CA)

( * ) Notice: Subject to any disclaimer, the term of this patent is extended or adjusted under 35 U.S.C. 154(b) by 343 days.

(21) Appl. No.: 17/429,220

(22) PCT Filed: Feb. 5, 2020

(86) PCT No.: PCT/CA2020/050146
§ 371 (c)(1),
(2) Date: Aug. 6, 2021

(87) PCT Pub. No.: WO2020/160663
PCT Pub. Date: Aug. 13, 2020

(65) Prior Publication Data
US 2022/0146253 A1    May 12, 2022

Related U.S. Application Data

(60) Provisional application No. 62/802,613, filed on Feb. 7, 2019.

(51) Int. Cl.
*G01B 11/16* (2006.01)
*E21B 47/01* (2012.01)
(Continued)

(52) U.S. Cl.
CPC ............ *G01B 11/165* (2013.01); *E21B 47/01* (2013.01); *B65H 59/40* (2013.01);
(Continued)

(58) Field of Classification Search
CPC ..... G01B 11/165; E21B 47/114; B65H 59/40; B65H 2701/32
See application file for complete search history.

(56) References Cited

U.S. PATENT DOCUMENTS 6,785,004 B2    8/2004   Kersey et al.
6,813,403 B2    11/2004  Tennyson
(Continued)

FOREIGN PATENT DOCUMENTS

WO    2013/102252 A1    7/2013
WO    2017/100946 A1    6/2017
WO    2019/213759 A1    11/2019

OTHER PUBLICATIONS

Lu, Z., & Sabatier, J. M. (2009). Effects of Soil Water Potential and Moisture Content on Sound Speed. Soil Science Society of America Journal, 73(5), 1614. https://doi.org/10.2136/sssaj2008.0073.

*Primary Examiner* — Sung H Pak
(74) *Attorney, Agent, or Firm* — D'Ambrosio & Menon, PLLC; Usha Menon

(57) ABSTRACT

A method of wrapping optical fiber around a fluid conduit. The optical fiber is wrapped at least partially around the conduit. The optical fiber is secured relative to the conduit at one or more securing locations, thereby defining a sequence of multiple optical fiber portions. Each optical fiber portion comprises a portion of the optical fiber. Each securing location delimits a given optical fiber portion from the subsequent optical fiber portion in the sequence of optical fiber portions. A direction of wrapping of each consecutive optical fiber portion in the sequence of optical fiber portions may be alternated between a clockwise direction and a counter-clockwise direction.

31 Claims, 13 Drawing Sheets

(51) Int. Cl.
  *B65H 59/40* (2006.01)
  *E21B 47/113* (2012.01)
  *F17D 5/06* (2006.01)

(52) U.S. Cl.
  CPC ......... *B65H 2701/32* (2013.01); *E21B 47/114* (2020.05); *F17D 5/06* (2013.01)

(56) References Cited

U.S. PATENT DOCUMENTS

| | | |
|---|---|---|
| 6,813,962 B2 | 11/2004 | Gysling et al. |
| 6,959,604 B2* | 11/2005 | Bryant .................... E21B 47/06 73/705 |
| 8,474,333 B2 | 7/2013 | Berendes et al. |
| 2016/0258795 A1* | 9/2016 | Farhadiroushan ... G02B 6/4415 |

* cited by examiner

METHODS OF WRAPPING OPTICAL FIBER AROUND A FLUID CONDUIT

FIELD OF THE DISCLOSURE

The present disclosure relates to methods of wrapping optical fiber around a fluid conduit such as a pipeline. The disclosure also relates to a fluid conduit wrapped with optical fiber according to any of the methods described herein.

BACKGROUND TO THE DISCLOSURE

Fiber optic cables are often used for distributed measurement systems in acoustic sensing applications. Pressure changes, due to sound waves for example, in the space immediately surrounding an optical fiber and that encounter the optical fiber cause dynamic strain in the optical fiber. Optical interferometry may be used to detect the dynamic strain along a segment of the fiber. Optical interferometry is a technique in which two separate light pulses, a sensing pulse and a reference pulse, are generated and interfere with each other. The sensing and reference pulses may, for example, be directed along an optical fiber that comprises fiber Bragg gratings. The fiber Bragg gratings partially reflect the pulses back towards an optical receiver at which an interference pattern is observed.

The nature of the interference pattern observed at the optical receiver provides information on the optical path length the pulses traveled, which in turn provides information on parameters such as the strain experienced by the segment of optical fiber between the fiber Bragg gratings. Information on the strain then provides information about the event that caused the strain.

It is known to use such optical fiber sensing systems to detect, for example, leaks in pipelines. In particular, a leak or other event will interfere with the optical path length of the optical fiber in the vicinity of the event, and such interference may be detected using interferometry as described above. Nevertheless, there is an ongoing need in the art to increase the effectiveness and reliability of such optical fiber sensing systems.

SUMMARY OF THE DISCLOSURE

According to a first aspect of the disclosure, there is provided a method of wrapping optical fiber around a fluid conduit, comprising: wrapping optical fiber at least partially around a fluid conduit; and securing the optical fiber relative to the fluid conduit at one or more securing locations, thereby defining a sequence of multiple optical fiber portions, each optical fiber portion comprising a portion of the optical fiber, wherein each securing location delimits a given optical fiber portion from the subsequent optical fiber portion in the sequence of optical fiber portions.

Wrapping the optical fiber around the fluid conduit, as opposed to disposing it in a straight line along the conduit, may improve the coupling between the optical fiber and the conduit. Improving the coupling may improve the sensitivity of the optical fiber to the detection of various parameters, including strain, temperature, and acoustics. Measurements of strain, in particular, may correlate well to pressure changes in the conduit. Thus, with an optical fiber that is well coupled to the conduit, strain measurements may provide a strong indicator of pressure. Increased acoustic/strain/thermal sensitivity may provide increased robustness to erratic strain, common-mode noise, speckle noise, and ambient acoustics. The measurements as they relate to pressure within the fluid conduit may be used as a supplementary leak detection feature.

Wrapping and securing the optical fiber may comprise: wrapping a first optical fiber portion at least partially around the fluid conduit; securing an end of the first optical fiber portion relative to the fluid conduit; and after securing the end of the first optical fiber portion, wrapping the subsequent optical fiber portion in the sequence of optical fiber portions at least partially around the fluid conduit.

Wrapping the optical fiber may comprise: wrapping a first optical fiber portion at least partially around the fluid conduit in one of a clockwise direction and a counter-clockwise direction; and wrapping the subsequent optical fiber portion in the sequence of optical fiber portions at least partially around the fluid conduit in the other of the clockwise direction and the counter-clockwise direction.

Wrapping the optical fiber may comprise alternating a direction of wrapping of each consecutive optical fiber portion in the sequence of optical fiber portions between a clockwise direction and a counter-clockwise direction.

Periodically alternating the direction of the wrapping may advantageously enable the optical fiber to be more easily wrapped around the fluid conduit when the optical fiber is initially provided on a spool. For example, for any appreciable length of fluid conduit, it can be highly undesirable to manually wrap the optical fiber around the fluid conduit according to a single wrapping direction—this would require the spool to be periodically passed over and under the conduit. By periodically alternating the direction of the wrapping, the spool does not need to be passed over or under the conduit.

Securing the optical fiber relative to the fluid conduit may comprise attaching the optical fiber to the fluid conduit. For example, the optical fiber may be attached using tape, or by banding the optical fiber to the fluid conduit. In some embodiments, securing the optical fiber relative to the fluid conduit may comprise preventing all or a substantial amount of movement of the optical fiber relative to the fluid conduit at the securing location. However, in some embodiments a small amount of movement of the optical fiber relative to the fluid conduit may be permitted.

Securing the optical fiber relative to the fluid conduit may comprise securing the optical fiber to an elongate member extending along the fluid conduit. The fluid conduit may be cylindrical and the elongate member may extend along an upper quadrant or a lower quadrant of the conduit.

The elongate member may extend along an uppermost portion or an undermost portion of the fluid conduit.

The method may further comprise securing an end of the optical fiber relative to the fluid conduit. One or both of the near and far ends of the optical fiber may be secured relative to the fluid conduit.

Wrapping the optical fiber may comprise wrapping at least one of the optical fiber portions at least 360 degrees around the fluid conduit, between about 270 and about 360 degrees around the fluid conduit, between about 180 and about 270 degrees around the fluid conduit, between about 90 and about 180 degrees around the fluid conduit, or less than 90 degrees around the fluid conduit The fluid conduit may be cylindrical and at least one of the one or more securing locations may be located on or adjacent an upper quadrant or an under quadrant of the fluid conduit. The at least one of the one or more securing locations may be located on or adjacent an uppermost or lowermost portion of the fluid conduit.

The method may further comprise tensioning each optical fiber portion. The tensioning may comprise, after wrapping a first optical fiber portion at least partially around the fluid conduit, tensioning the first optical fiber portion before wrapping the subsequent optical fiber portion in the sequence of optical fiber portions at least partially around the fluid conduit and before securing the optical fiber relative to the fluid conduit at the securing location delimiting the first and the subsequent optical fiber portions.

The optical fiber may comprise one or more fiber Bragg gratings (FBGs) operable to reflect light of one or more wavelengths or one or more ranges of wavelengths. Each optical fiber portion may comprise a respective group of one or more FBGs, and the one or more FBGs of each optical fiber portion may be operable to reflect light of a respective wavelength or a respective range of wavelengths.

The optical fiber may be housed within a protective sheath. The protective sheath may comprise a high-density polyethylene conduit, a capillary tube, or a tactical cable.

An extent of the fluid conduit about which is wrapped the optical fiber may be located wholly above ground.

An extent of the fluid conduit about which is wrapped the optical fiber may be at least partially buried. The one or more securing locations may be located along a lower half of the fluid conduit.

Wrapping the optical fiber may comprise wrapping the optical fiber around at least a portion of an upper half of the fluid conduit.

Wrapping the optical fiber may comprise wrapping each optical fiber portion at least partially around the fluid conduit such that each optical fiber portion defines a curved path along the fluid conduit. The curved path may comprise at least a portion of a sinusoidal-shaped path.

The method may further comprise, prior to wrapping the optical fiber, providing a spool with the optical fiber wrapped therearound.

The fluid conduit may comprise a pipeline or a wellbore.

Wrapping the optical fiber may comprise passing a bight, loop, or similar portion of the optical fiber under or over the fluid conduit.

In a further aspect of the disclosure, there is provided a fluid conduit comprising optical fiber wrapped at least partially therearound, and secured relative thereto, according to any of the above-described methods.

In a further aspect of the disclosure, there is provided a fluid conduit comprising optical fiber wrapped at least partially therearound, and secured relative thereto, according to any of the above-described methods. The system further comprises an interrogator optically coupled to the optical fiber and operable to interrogate the optical fiber by sending one or more light pulses along the optical fiber and receiving reflections of the one or more light pulses from fiber Bragg gratings provided along the optical fiber. The system may comprise any of the features described above in connection with the first aspect of the disclosure.

In a further aspect of the disclosure, there is provided a method of wrapping optical fiber around a fluid conduit, comprising: wrapping optical fiber around at least a portion of a fluid conduit, wherein the optical fiber comprises groups of one or more fiber Bragg ratings (FBGs), each group of one or more FBGs operable to reflect light of respective one or more wavelengths or light of respective one or more ranges of wavelengths. The method may comprise any of the features described above in connection with the first aspect of the disclosure.

BRIEF DESCRIPTION OF THE DRAWINGS

Embodiments of the disclosure will now be described in detail in conjunction with the accompanying drawings of which:

FIGS. 8-12 are schematic diagrams of optical fiber being wrapped around a partially buried fluid conduit, in accordance with embodiments of the disclosure.

DETAILED DESCRIPTION OF EXAMPLE EMBODIMENTS

The present disclosure seeks to provide improved methods and systems for wrapping optical fiber around a fluid conduit. While various embodiments of the disclosure are described below, the disclosure is not limited to these embodiments, and variations of these embodiments may well fall within the scope of the disclosure which is to be limited only by the appended claims.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

Figure 1A:
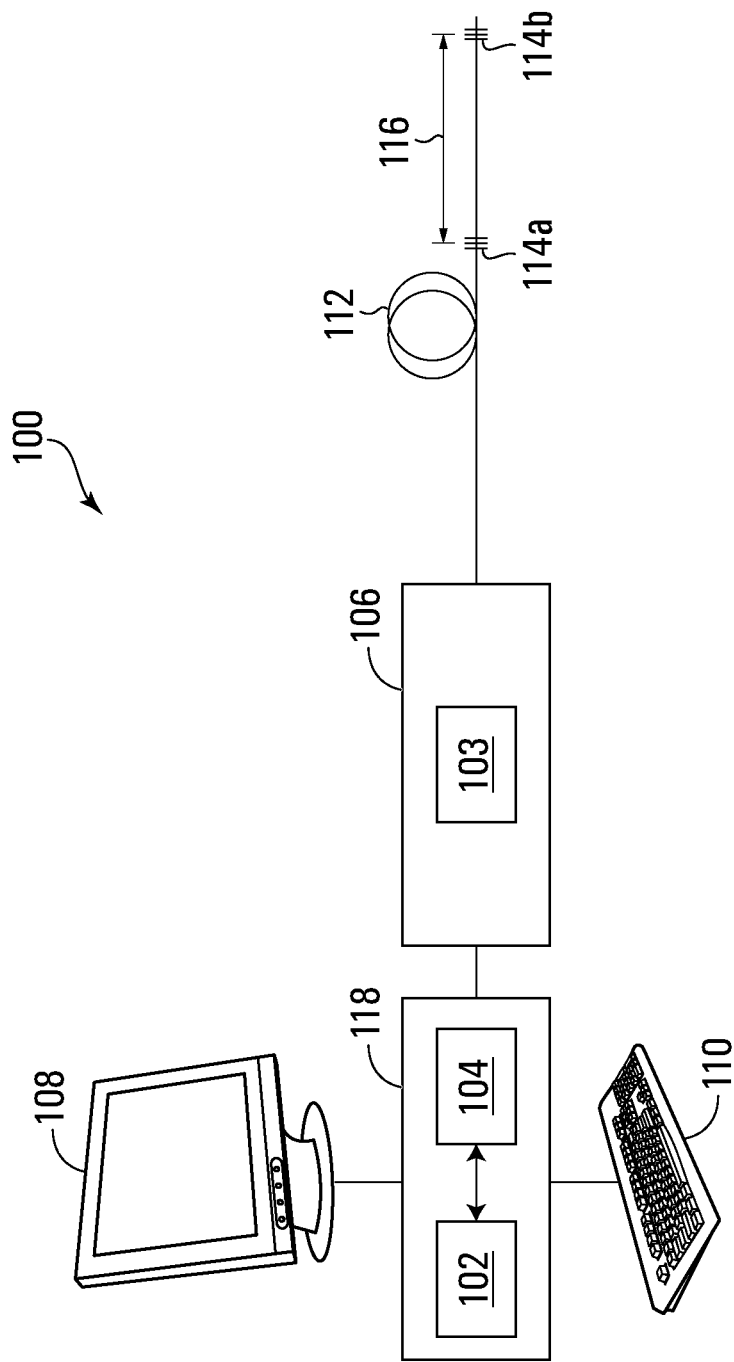
FIG. 1A is a block diagram of a system for determining whether an event has occurred from dynamic strain measurements, which includes an optical fiber with fiber Bragg gratings for reflecting a light pulse, in accordance with embodiments of the disclosure.

Referring now to FIG. 1A, there is shown one embodiment of a system 100 for performing interferometry using fiber Bragg gratings ("FBGs"). The system 100 comprises optical fiber 112, an interrogator 106 optically coupled to the optical fiber 112, and a signal processing device 118 that is communicative with the interrogator 106.

The optical fiber 112 comprises one or more fiber optic strands, each of which is made from quartz glass (amorphous SiO2). The fiber optic strands are doped with various elements and compounds (including germanium, erbium oxides, and others) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and InfmiCor® series multimode fibers.

The interrogator 106 generates the sensing and reference pulses and outputs the reference pulse after the sensing pulse. The pulses are transmitted along optical fiber 112 that comprises a first pair of FBGs. The first pair of FBGs comprises first and second FBGs 114a,b (generally, "FBGs 114"). The first and second FBGs 114a,b are separated by a certain segment 116 of the optical fiber 112 ("fiber segment 116"). The optical length of the fiber segment 116 varies in response to dynamic strain that the fiber segment 116 experiences.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1A shows only the one pair of FBGs 114a,b, in alternative embodiments (not depicted) any number of FBGs 114 may be on the fiber 112, and time division multiplexing (TDM) (and, optionally, wavelength division multiplexing (WDM)) may be used to simultaneously obtain measurements from them. If two or more pairs of FBGs 114 are used, any one of the pairs may be tuned to reflect a different center wavelength than any other of the pairs. Alternatively, a group of multiple FBGs 114 may be tuned to reflect a different center wavelength to another group of multiple FBGs 114, and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the interrogator 106. When different pairs of the FBGs 114 are not tuned to different center wavelengths, TDM is sufficient.

The interrogator 106 emits laser light with a wavelength selected to be identical or sufficiently near the center wavelength of the FBGs 114, and each of the FBGs 114 partially reflects the light back towards the interrogator 106. The timing of the subsequently transmitted light pulses is such that the light pulses reflected by the first and second FBGs 114a,b interfere with each other at the interrogator 106, which records the resulting interference signal. The strain that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences.

The signal processing device 118 is communicatively coupled to the interrogator 106 to receive the output signal. The signal processing device 118 includes a processor 102 and a non-transitory computer-readable medium 104 that are communicatively coupled to each other. An input device 110 and a display 108 interact with control module 250. The computer-readable medium 104 has stored on it program code to cause control module 250 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics. Control module 250 may apply to the output signal a low pass filter with a cut-off frequency of 20 Hz, to isolate the vibration portion of the output signal from the acoustics portion of the output signal. Analogously, to isolate the acoustics portion of the output signal from the vibration portion, control module 250 may apply a high-pass filter with a cut-off frequency of 20 Hz. Control module 250 may also apply more complex signal processing methods to the output signal; example methods include those described in PCT application PCT/CA2012/000018 (publication number WO 2013/102252), the entirety of which is hereby incorporated by reference.

Figure 1B:
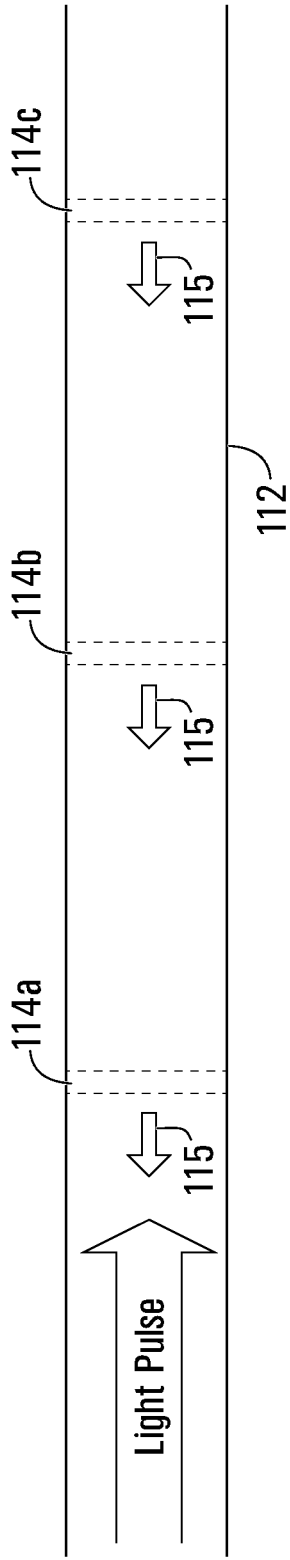
FIG. 1B is a schematic diagram that depicts how the FBGs reflect a light pulse, in accordance with embodiments of the disclosure.

FIG. 1B depicts how the FBGs 114 reflect the light pulse, according to another embodiment in which the optical fiber 112 comprises a third FBG 114c. In FIG. 1B, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114a,b can reflect off the third FBG 114c and any subsequent FBGs 114, resulting in interferometry that can be used to detect strain along the fiber 112 occurring further from the interrogator 106 than the second FBG 114b. For example, in the embodiment of FIG. 1B, a portion of the sensing pulse not reflected by the first and second FBGs 114a,b can reflect off the third FBG 114c, and a portion of the reference pulse not reflected by the first FBG 114a can reflect off the second FBG 114b, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference (Θ) is as follows:

$$\Theta = 2\pi n L/\lambda,$$

where n is the index of refraction of the optical fiber, L is the physical path length of the fiber segment 116, and λ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy. As used herein, "dynamic strain" refers to strain that changes over time. Dynamic strain that has a frequency of between about 5 Hz and about 20 Hz is referred to by persons skilled in the art as "vibration", dynamic strain that has a frequency of greater than about 20 Hz is referred to by persons skilled in the art as "acoustics", and dynamic strain that changes at a rate of <1 Hz, such as at 500 μHz, is referred to as "sub-Hz strain".

Figure 1C:
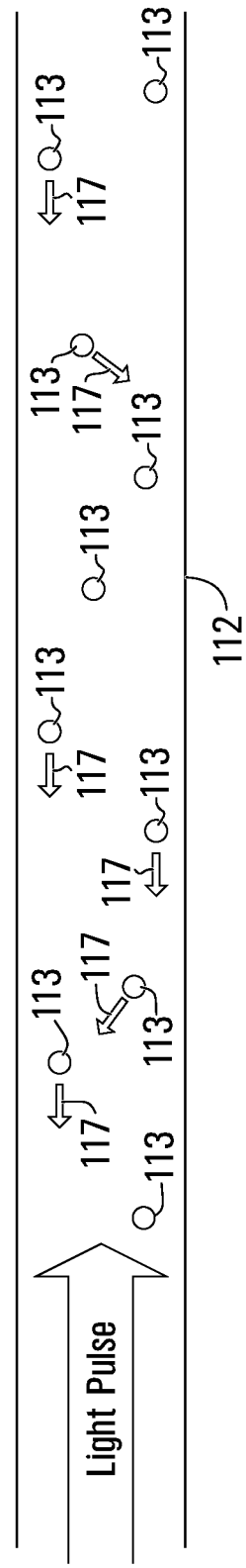
Figure 10:
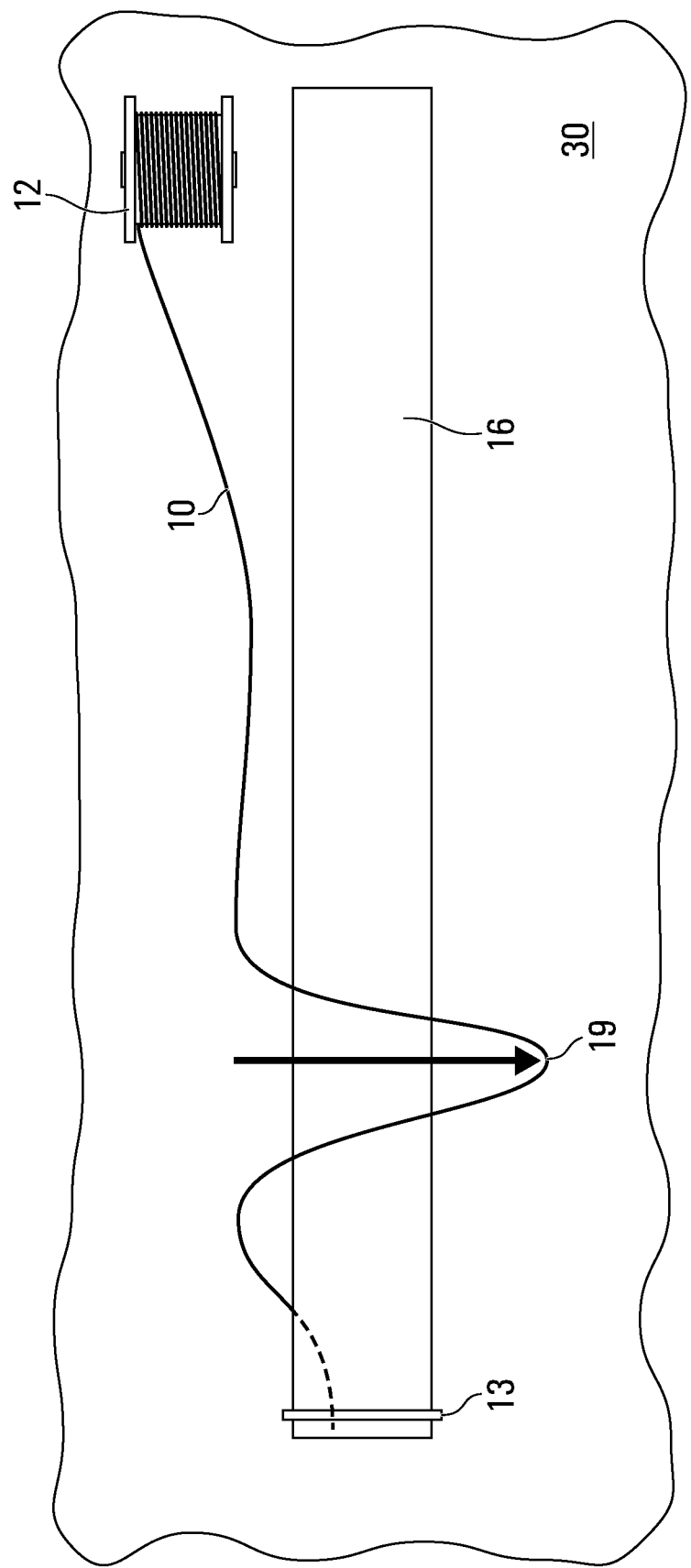
FIG. 10 is a schematic diagram that depicts how a light pulse interacts with impurities in an optical fiber that results in scattered laser light due to Rayleigh scattering, which is used for distributed acoustic sensing ("DAS"), in accordance with embodiments of the disclosure.

One conventional way of determining ΔnL is by using what is broadly referred to as distributed acoustic sensing ("DAS"). DAS involves laying the fiber 112 through or near a region of interest and then sending a coherent laser pulse along the fiber 112. As shown in FIG. 10, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back-scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 1C, Rayleigh scattering transmits less light back towards the optical receiver 103 than using the FBGs 114.

DAS accordingly uses Rayleigh scattering to estimate the magnitude, with respect to time, of the strain experienced by the fiber during an interrogation time window, which is a proxy for the magnitude of the vibration or acoustics emanating from the region of interest. In contrast, the embodiments described herein measure dynamic strain using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of between 0.1% and 5%. The use of FBG-based interferometry to measure dynamic strain offers several advantages over DAS, in terms of optical performance.

Figure 2:
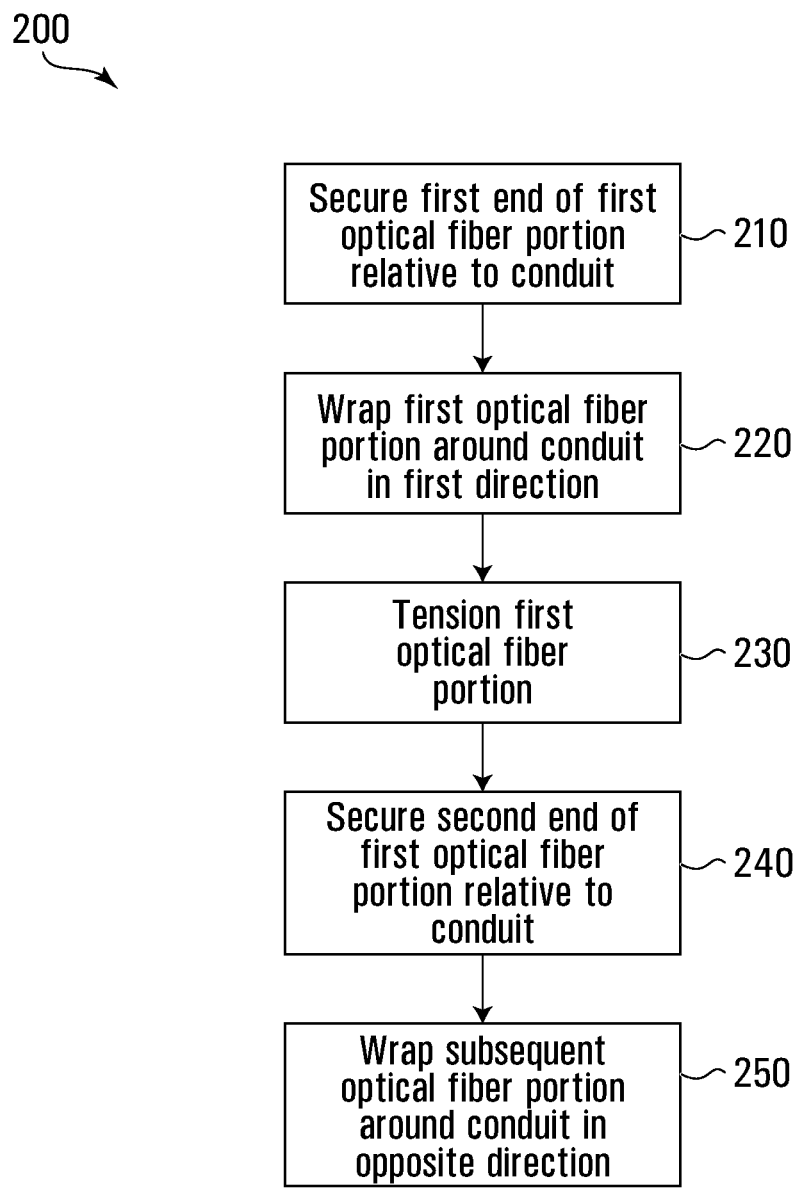
FIG. 2 is a flow diagram of a method of wrapping an optical fiber around a fluid conduit, in accordance with embodiments of the disclosure.

Turning to FIG. 2, there is shown a method 200 of wrapping optical fiber around a fluid conduit, in accordance with embodiments of the disclosure. With reference to FIGS. 3-7, the method shown in FIG. 2 is first described in the context of a pipeline that is located wholly above ground 30. For example, the pipeline may be suspended above ground 30 using one or more supports.

Typically, the optical fiber is pre-deployed within a protective sheath or conduit, such as a high-density polyethylene (HDPE) conduit, stainless steel capillary tubes, or in a tactical cable. In the following description, therefore, references to optical fiber refer to optical fiber deployed within a protective sheath or conduit. Furthermore, such optical fiber is typically pre-wound on a spool. However, as mentioned above, in such cases it may be difficult and inefficient to wrap the optical fiber around a pipeline. In particular, in order to wrap the optical fiber around the pipeline, the spool must be manually passed over and under the pipeline, for every full winding of the optical fiber. At least some of the methods described herein therefore seek to address this problem, as described in further detail below.

Figure 3:
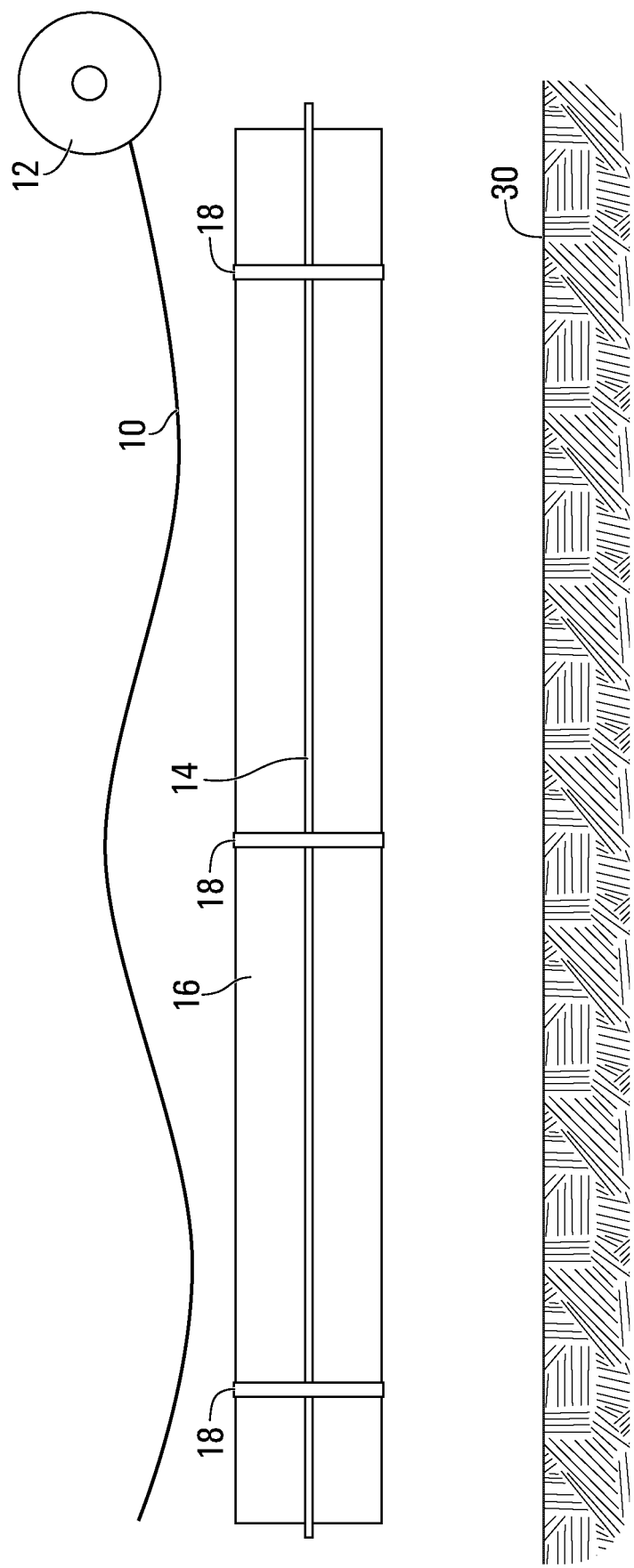
FIGS. 3-7 are schematic diagrams of optical fiber being wrapped around a fluid conduit located above ground, in accordance with embodiments of the disclosure.
Figure 4:
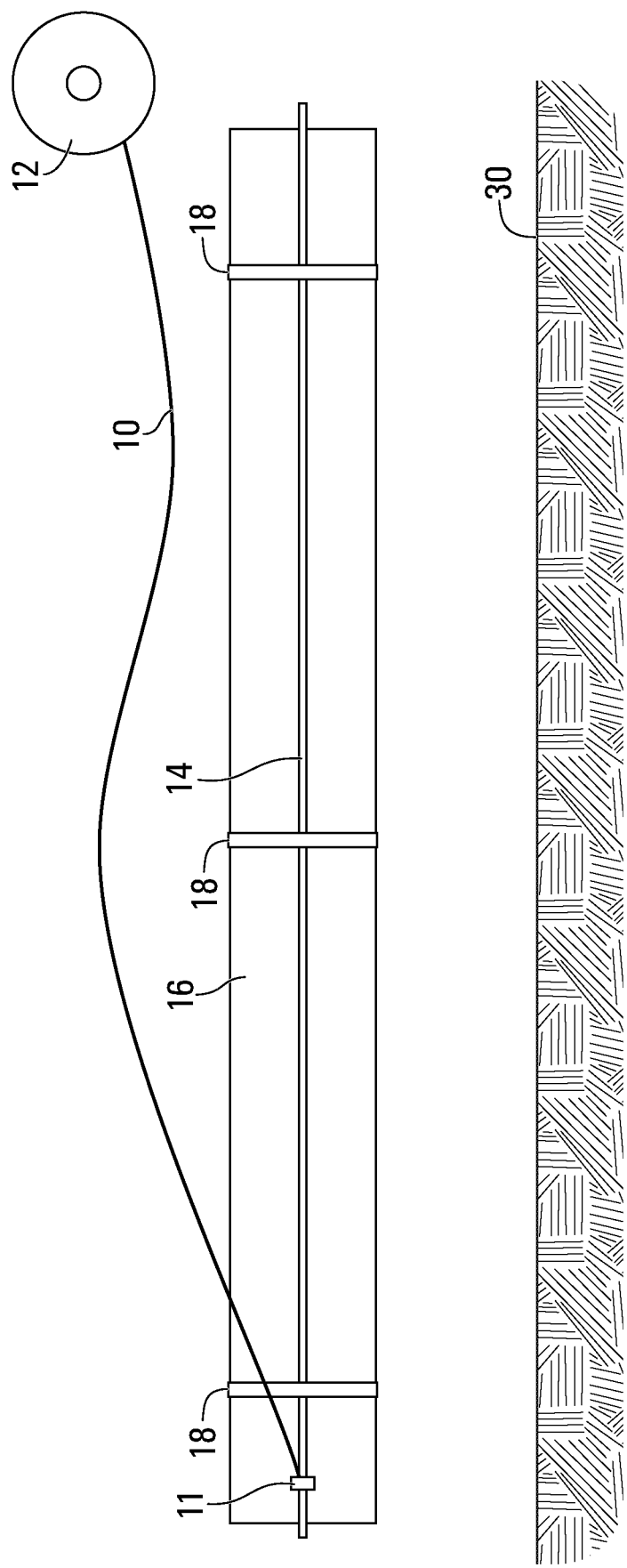

Turning to FIG. 3, there is shown a top half of a portion of a pipeline 16. A length of optical fiber 10 is wound about a spool 12, and a portion of optical fiber 10 is positioned alongside pipeline 16. A supporting structure, comprising an elongate member or rod 14 attached to pipeline 16 by supports 18 positioned along the length of pipeline 16, provides means for securing optical fiber 10 relative to pipeline 16, as described in further detail below.

Figure 5:
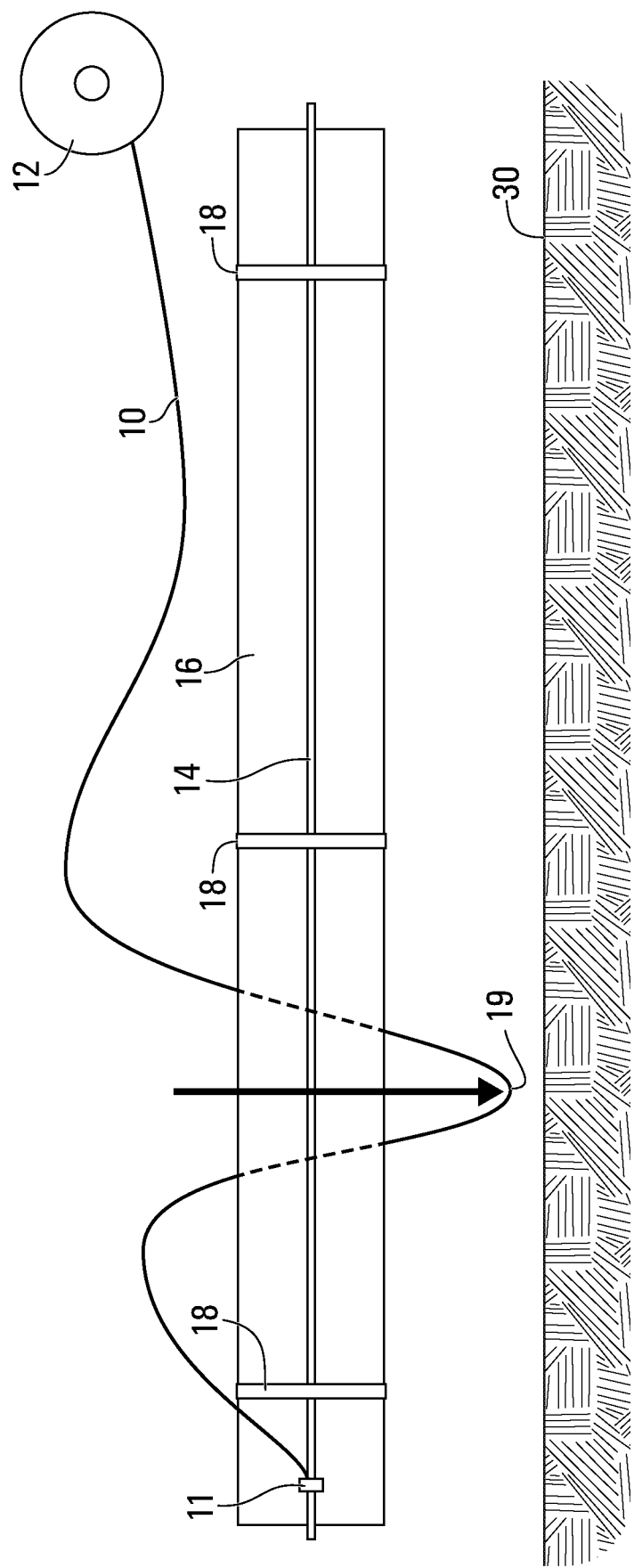

At block 210 of FIG. 2, and with reference to FIG. 3, a first end of optical fiber 10 is secured relative to pipeline 16 by attaching optical fiber 10 to rod 14. Optical fiber 10 may be attached to rod 14 using various means, such as by using pipeline tape, a band, or by being fed through a ring affixed to the outside of pipeline 16. According to some embodiments, the first end of optical fiber 10 is terminated in a hand-hole (splice box). At block 220 of FIG. 2, optical fiber 10 is wrapped around pipeline 16. For example, as can be seen in FIG. 5, optical fiber 10 is wrapped around pipeline 16 such that a portion 19 (e.g. a bight) of optical fiber 10 is passed underneath pipeline 16. In some embodiments, optical fiber 10 may be wrapped around pipeline 16 in the opposite direction to that shown in FIG. 5. In other words, whereas in FIG. 5 optical fiber 10 is being wrapped in a counter-clockwise direction relative to pipeline 16, in other embodiments optical fiber 10 may be first wrapped in a clockwise direction relative to pipeline 16.

Figure 6:
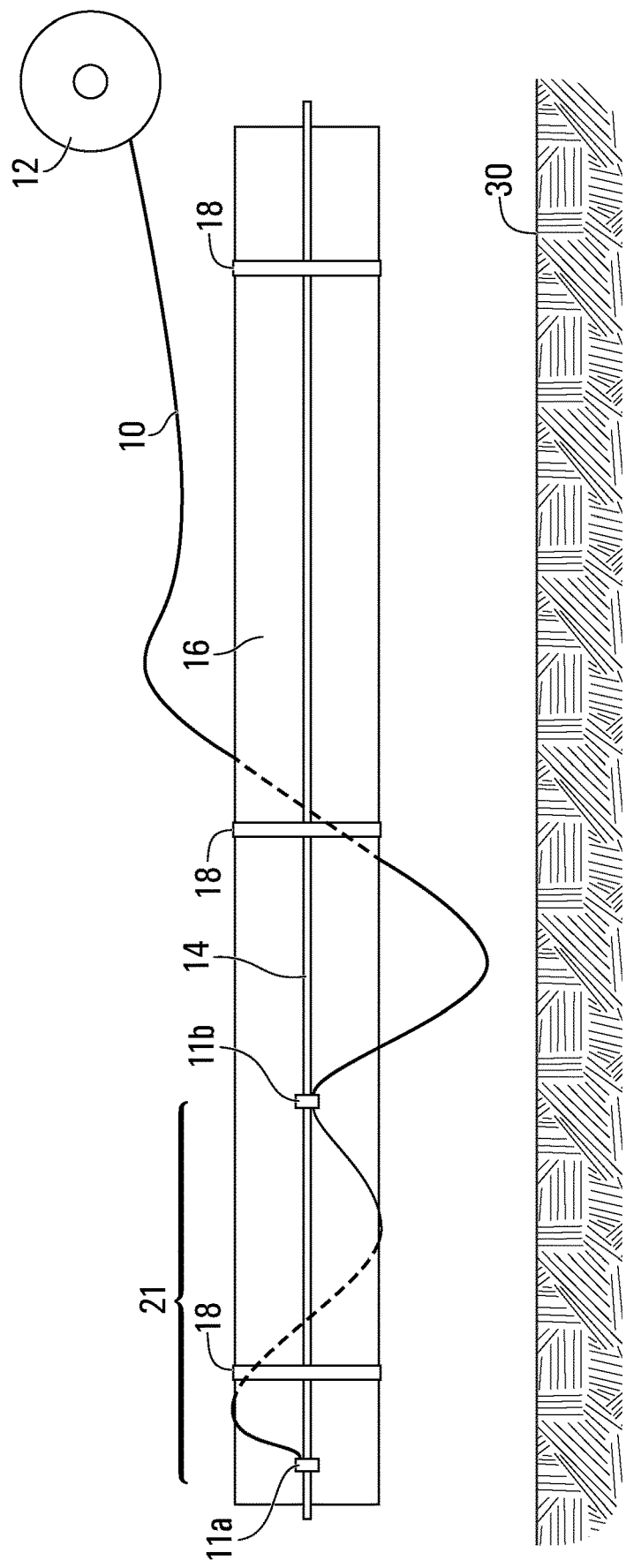

At block 230 of FIG. 2, optical fiber 10 is tensioned against pipeline 16. At block 240 of FIG. 2, optical fiber 10 is secured relative to pipeline 16 at a securing location 11b, as can be seen in FIG. 6. For example, optical fiber 10 may be clipped to or otherwise attached to rod 14, using one or more example means described above. The securing of optical fiber 10 relative to pipeline 16 defines a first optical fiber portion 21. Optical fiber portion 21 defines a full 360-degree wrap around pipeline 16.

In some embodiments, the order of blocks 230 and 240 of FIG. 2 may be reversed. For example, optical fiber 10 may be first passed through a clip at securing location 11b, and optical fiber 10 may then be tensioned against pipeline 16 by pulling on optical fiber 10 at a point to the right of securing location 11b. After the tensioning, the clip may be locked so that optical fiber 10 may no longer move relative to the clip. Once the clip is locked, optical fiber portion 21 is defined as shown in FIG. 6, and in particular comprises the portion of optical fiber 10 extending from securing location 11a to securing location 11b.

Figure 7:
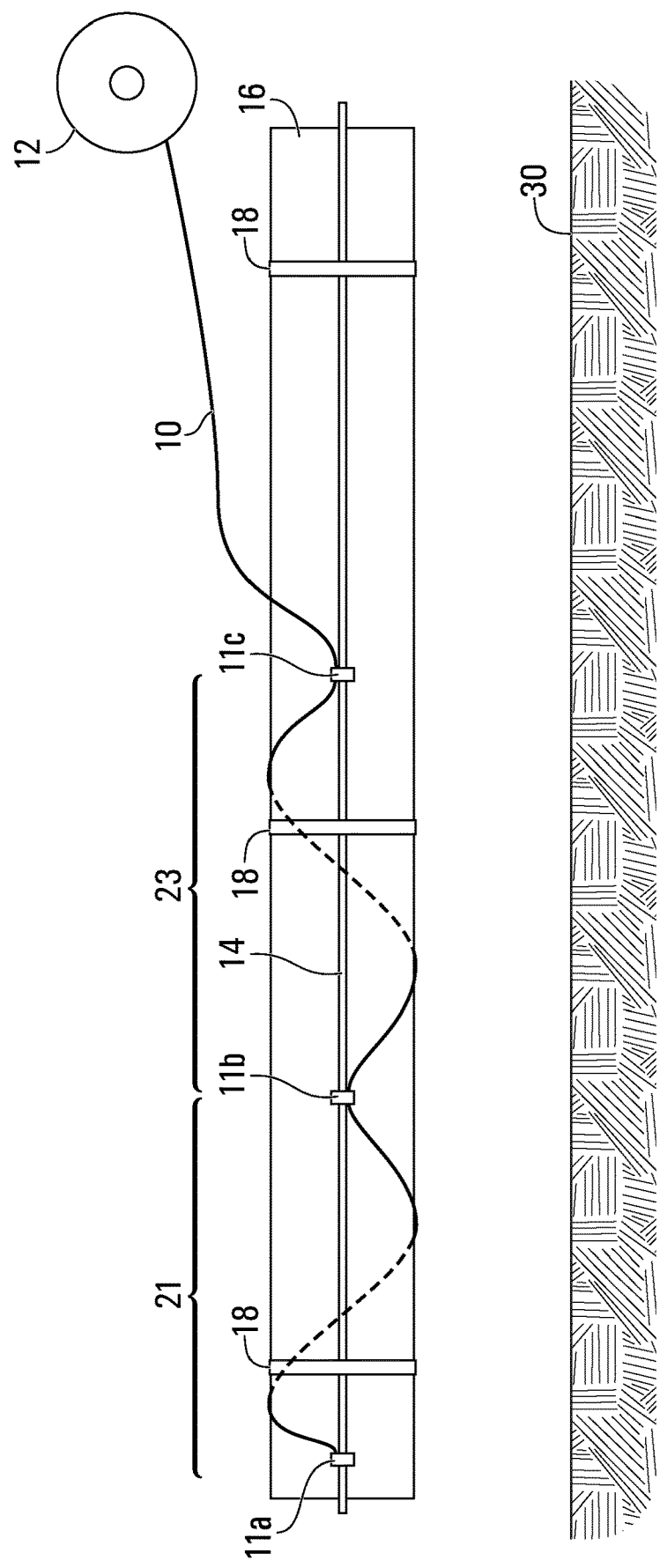

At block 250 of FIG. 2, optical fiber 10 is wrapped around pipeline 16 in a direction opposite to the wrapping direction of optical fiber portion 21, and is then further secured (and tensioned) at a securing location 11c. Thus, as can be seen in FIG. 7, an optical fiber portion 23 is defined between securing location 11b and securing location 11c, and is delimited from optical fiber portion 21 by securing location 11b. Optical fiber portion 23 is wrapped around pipeline 16 in a clockwise direction. Thus, optical fiber portion 23 defines a full 360-degree wrap around pipeline 16, in a direction opposite to the wrapping direction of optical fiber portion 21.

After the securing of optical fiber 10 at securing location 11c, optical fiber 10 may continue to be wrapped around pipeline 16, with the optical fiber portion subsequent to optical fiber portion 23 being wrapped in a direction opposite to the wrapping direction of optical fiber portion 23. Thus, the wrapping direction of each optical fiber portion alternates from one optical fiber portion to the next, in the sequence of optical fiber portions defined by securing locations 11. In this manner, there is no need for spool 12 to be passed over and under pipeline 16, and thus the wrapping of optical fiber 10 about pipeline 16 is facilitated.

Figure 8:
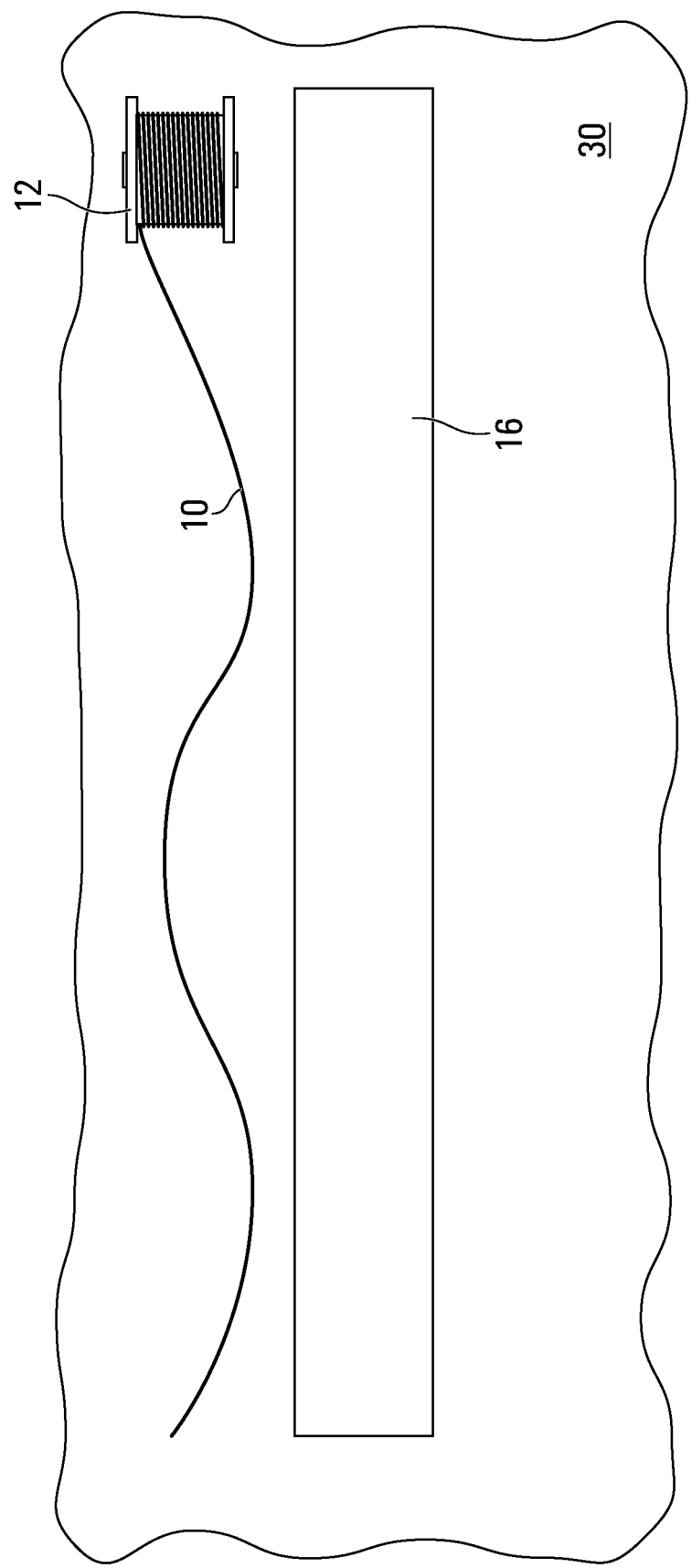

Turning to FIG. 8, there is now shown the case of a pipeline 16 that is partially buried along its length. FIG. 8 shows a top side of pipeline 16.

Figure 9A:
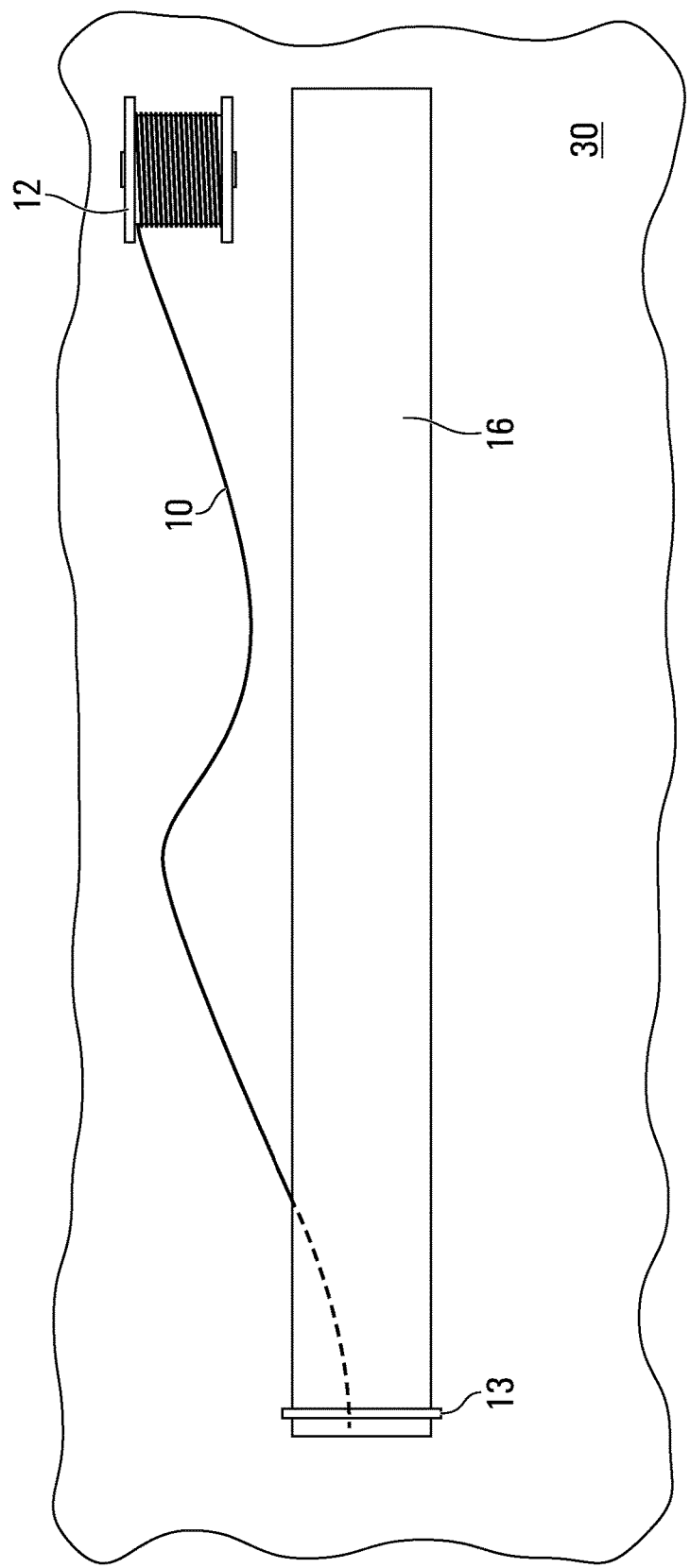
Figure 9B:
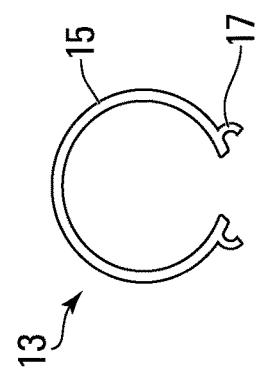

Initially, optical fiber 10 is partially unwound from a spool 12 and positioned alongside pipeline 16. As can be seen in FIG. 9A, an end of optical fiber 10 is attached to a clip 13 (block 210 of FIG. 2). Clip 13 comprises a circular body 15 and two hooks 17 positioned at ends of body 15 (FIG. 9B). Depending on the depth to which pipeline 16 is buried, clip 13 may be modified such that the arc defined by body 15 is reduced in extent, the goal being to ensure that, once clip 13 is positioned around pipeline 16, hooks 17 are located above ground 30.

Turning to FIG. 10, and with reference to block 220 of FIG. 2, optical fiber 10 is wrapped around pipeline 16. In particular, optical fiber 10 is wrapped around pipeline 16 such that a portion 19 (e.g. a bight) of optical fiber 10 is passed over pipeline 16. In some embodiments, optical fiber 10 may be wrapped around pipeline 16 in the opposite direction to that shown in FIG. 10. In other words, whereas in FIG. 10 optical fiber 10 is being wrapped in a clockwise direction relative to pipeline 16, in other embodiments optical fiber 10 may be first wrapped in a counter-clockwise direction relative to pipeline 16. The direction in which optical fiber 10 is first wrapped around pipeline 16 depends generally on which hook 17 of clip 13 the end of optical fiber 10 is attached to.

Figure 11:
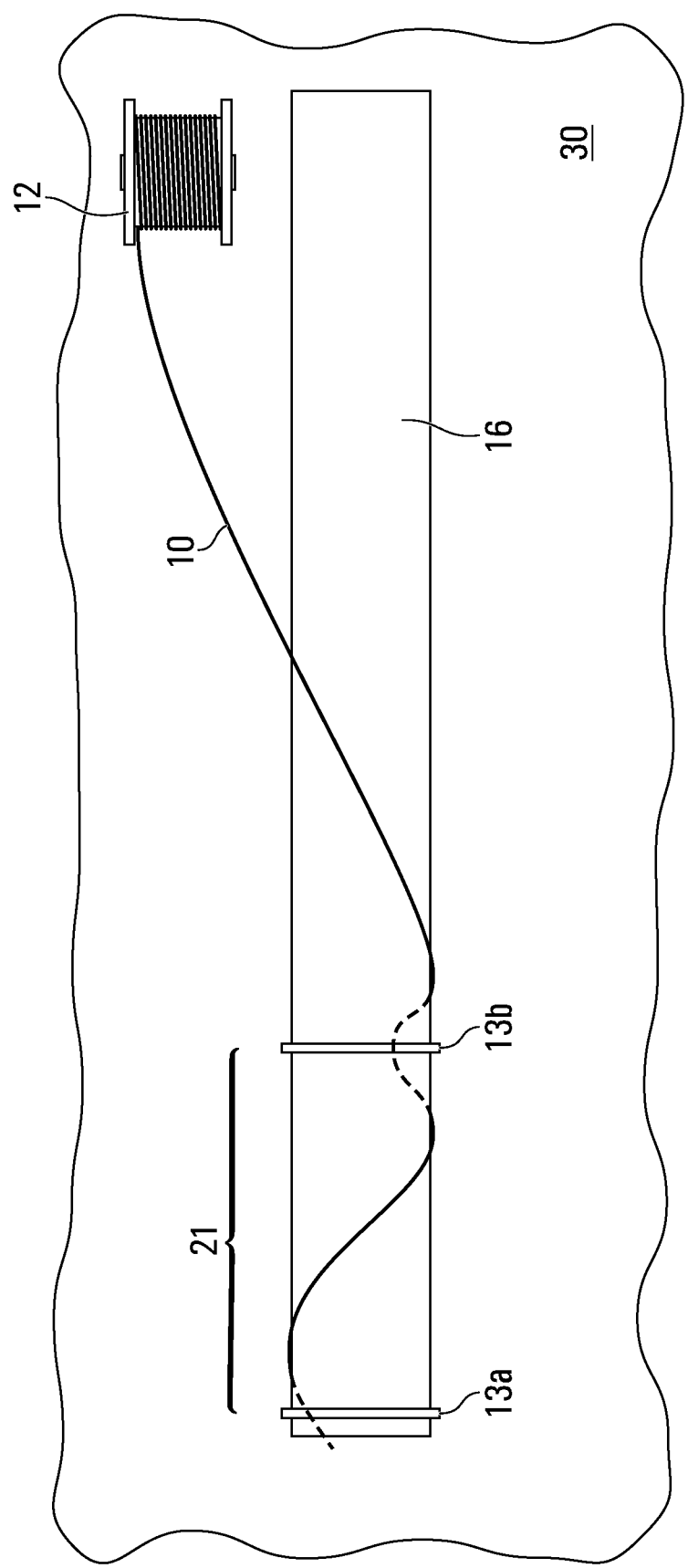

At block 230 of FIG. 2, optical fiber 10 is tensioned against pipeline 16. At block 240 of FIG. 2, and as can be seen in FIG. 11, optical fiber 10 is secured relative to pipeline 16 at a securing location corresponding to clip 13b by passing optical fiber 10 through one of hooks 17 of clip 13b. The securing of optical fiber 10 relative to pipeline 16 defines a first optical fiber portion 21. Optical fiber portion 21 defines a roughly 300-degree wrap around pipeline 16. The radial extent to which optical fiber 10 may be wrapped around pipeline 16 will depend on the extent to which pipeline 16 is buried.

In some embodiments, the order of blocks 230 and 240 of FIG. 2 may be reversed. For example, optical fiber 10 may be first passed through a hook 17 of clip 13b and may then be tensioned against pipeline 16 by pulling on optical fiber 10 at a point to the right of clip 13b. A second, subsequent portion of optical fiber 10 may then be wrapped around pipeline 16 as described below. In such a case, the securing of optical fiber 10 relative to pipeline 10 may be accomplished at least in part by the reversal of the wrapping direction of the second, subsequent portion of optical fiber 10 relative to the first optical fiber portion 21.

Figure 12:
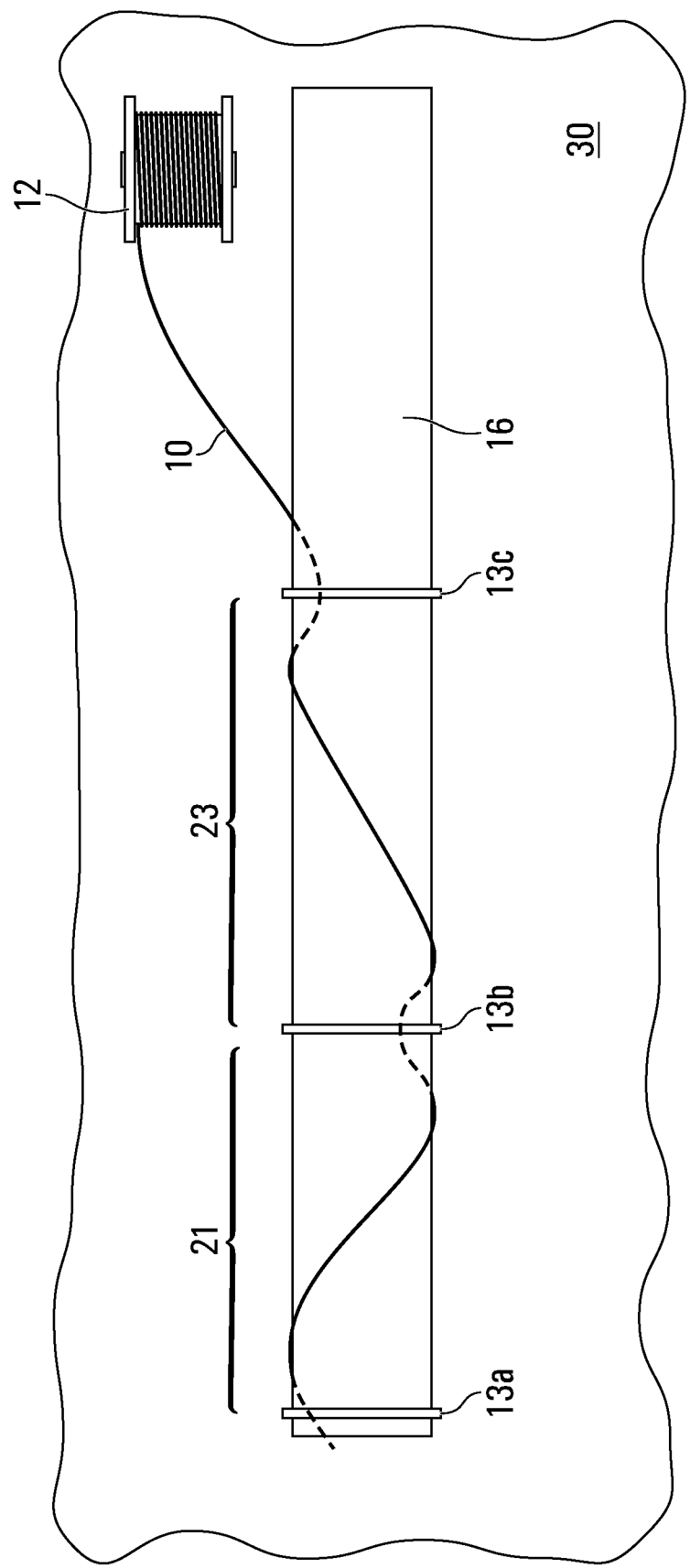

At block 250 of FIG. 2, optical fiber 10 is wrapped around pipeline 16 in a direction opposite to the wrapping direction of optical fiber portion 21, and is then further secured (and tensioned) at a securing location corresponding to clip 13c. Thus, as can be seen in FIG. 12, an optical fiber portion 23 is defined between clip 13b and clip 13c, and is delimited from optical fiber portion 21 by clip 13b. Optical fiber portion 23 is wrapped around pipeline 16 in a counter-clockwise direction. Optical fiber portion 23 defines a roughly 300-degree wrap around pipeline 16, in a direction opposite to the wrapping direction of optical fiber portion 21.

After the securing of optical fiber 10 to clip 13c, optical fiber 10 may continue to be wrapped around pipeline 16, with the optical fiber portion subsequent to optical fiber portion 23 being wrapped in a direction opposite to the wrapping direction of optical fiber portion 23. Thus, the wrapping direction of each optical fiber portion alternates from one optical fiber portion to the next, in the sequence of optical fiber portions defined by securing locations corresponding to clips 13.

In any of the above-described embodiments, alternative securing means or methods may be used to secure optical fiber 10 relative to pipeline 16, or otherwise attach or fix optical fiber 10 relative to pipeline 16.

In addition to facilitating the wrapping of optical fiber around a fluid conduit, the methods described herein enable interferometric data with a greater spatial resolution to be obtained from the optical fiber. In particular, by wrapping optical fiber around a fluid conduit such that the optical fiber defines a curved path along the fluid conduit, a greater amount of optical fiber is provided per unit length of the fluid conduit. Effectively, the fluid conduit is provided with a greater density of optical fiber, as opposed to the case where, for example, optical fiber is provided in a straight line alongside the fluid conduit. Thus, the spatial resolution of interferometric data obtained from the optical fiber may be increased, as a result of any of the wrapping patterns and methods described herein. Furthermore, as also described above, the coupling of the optical fiber to the fluid conduit may be improved.

As also described above, the optical fiber may be provided with groups of one or more FGBs, each group of one or more FBGs being operable to reflect light of one or more respective wavelengths or light of one or more respective ranges of wavelengths. Thus, different portions or "channels" of the fluid conduit may be associated with different groups of FBGs. Data from a specific channel may be isolated from that of other channels based on the wavelength or range of wavelengths of the light that is reflected from the FBG group associated with that channel. Thus, a leak or other event may be linked to a specific channel or channels.

In some embodiments, in addition to being secured relative to the fluid conduit at the securing locations that delimit one optical fiber portion from adjacent optical fiber portions, the optical fiber may be attached or secured relative to the conduit at other points in-between successive securing locations.

Furthermore, in the context of a fluid conduit that is whole above-ground, according to some embodiments each optical fiber portion may be wrapped less than 360 degrees around the fluid conduit. For example, each optical fiber portion may be wrapped less than 270 degrees, less than 180 degrees, or less than 90 degrees around the fluid conduit, before the wrapping direction of the optical fiber is reversed.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A method of wrapping optical fiber around a fluid conduit, comprising:
  wrapping optical fiber at least partially around the fluid conduit; and
  securing the optical fiber relative to the fluid conduit at one or more securing locations, thereby defining a sequence of multiple optical fiber portions, each optical fiber portion comprising a portion of the optical fiber, wherein each securing location delimits a given optical fiber portion from a subsequent optical fiber portion in the sequence of optical fiber portions,
  wherein wrapping the optical fiber comprises:
    wrapping a first optical fiber portion around the fluid conduit in one of a clockwise direction and a counter-clockwise direction; and
    wrapping a second optical fiber portion around the fluid conduit in the other of the clockwise direction and the counter-clockwise direction, wherein:
      relative to the first optical fiber portion, the second optical fiber portion is the subsequent optical fiber portion in the sequence of optical fiber portions; and
      one of the one or more securing locations delimits the first optical fiber portion from the second optical fiber portion.

2. The method of claim 1, wherein wrapping and securing the optical fiber comprises:
  wrapping the first optical fiber portion around the fluid conduit;
  securing an end of the first optical fiber portion relative to the fluid conduit; and
  after securing the end of the first optical fiber portion, wrapping the second optical fiber portion around the fluid conduit.

3. The method of claim 1, wherein wrapping the optical fiber further comprises alternating a direction of wrapping of each consecutive optical fiber portion in the sequence of optical fiber portions between the clockwise direction and the counter-clockwise direction.

4. The method of claim 1, wherein securing the optical fiber relative to the fluid conduit comprises attaching the optical fiber to the fluid conduit.

5. The method of claim 1, wherein securing the optical fiber relative to the fluid conduit comprises securing the optical fiber to an elongate member extending along the fluid conduit.

6. The method of claim 5, wherein the fluid conduit is cylindrical and wherein the elongate member extends along an upper quadrant or a lower quadrant of the fluid conduit.

7. The method of claim 5, wherein the elongate member extends along an uppermost portion or a lowermost portion of the fluid conduit.

8. The method of claim 1, further comprising securing an end of the optical fiber relative to the fluid conduit.

9. The method of claim 1, wherein wrapping the optical fiber further comprises wrapping at least one of the optical fiber portions at least 360 degrees around the fluid conduit.

10. The method of claim 1, wherein wrapping the optical fiber further comprises wrapping at least one of the optical fiber portions between about 270 and about 360 degrees around the fluid conduit.

11. The method of claim 1, wherein wrapping the optical fiber further comprises wrapping at least one of the optical fiber portions between about 180 and about 270 degrees around the fluid conduit.

12. The method of claim 1, wherein wrapping the optical fiber further comprises wrapping at least one of the optical fiber portions between about 90 and about 180 degrees around the fluid conduit.

13. The method of claim 1, wherein wrapping the optical fiber further comprises wrapping at least one of the optical fiber portions less than 90 degrees around the fluid conduit.

14. The method of claim 1, wherein the fluid conduit is cylindrical and wherein at least one of the one or more securing locations is located on or adjacent an upper quadrant or an under quadrant of the fluid conduit.

15. The method of claim 1, further comprising tensioning each optical fiber portion.

16. The method of claim 15, wherein the tensioning comprises, after wrapping the first optical fiber portion around the fluid conduit, tensioning the first optical fiber portion before wrapping the second optical fiber portion around the fluid conduit and before securing the optical fiber relative to the fluid conduit at the securing location delimiting the first optical fiber portion from the second optical fiber portions.

17. The method of claim 1, wherein the optical fiber comprises one or more fiber Bragg gratings (FBGs) operable to reflect light of one or more wavelengths or one or more ranges of wavelengths.

18. The method of claim 17, wherein each optical fiber portion comprises a respective group of one or more FBGs, and wherein the one or more FBGs of each optical fiber portion are operable to reflect light of a respective wavelength or a respective range of wavelengths.

19. The method of claim 1, wherein the optical fiber is housed within a protective sheath.

20. The method of claim 19, wherein the protective sheath comprises a high-density polyethylene conduit, a capillary tube, or a tactical cable.

21. The method of claim 1, wherein an extent of the fluid conduit about which is wrapped the optical fiber is located wholly above ground.

22. The method of claim 1, wherein an extent of the fluid conduit about which is wrapped the optical fiber is at least partially buried.

23. The method of claim 22, wherein the one or more securing locations are located along a lower half of the fluid conduit.

24. The method of claim 1, wherein wrapping the optical fiber further comprises wrapping the optical fiber around at least a portion of an upper half of the fluid conduit.

25. The method of claim 1, wherein wrapping the optical fiber further comprises wrapping each optical fiber portion at least partially around the fluid conduit such that each optical fiber portion defines a curved path along the fluid conduit.

26. The method of claim 21, wherein the curved path comprises at least a portion of a sinusoidal-shaped path.

27. The method of claim 1, further comprising, prior to wrapping the optical fiber, providing a spool with the optical fiber wrapped therearound.

28. The method of claim 1, wherein the fluid conduit comprises a pipeline or a wellbore.

29. The method of claim 1, wherein wrapping the optical fiber further comprises passing a bight of the optical fiber under or over the fluid conduit.

30. A fluid conduit comprising optical fiber wrapped at least partially therearound, and secured relative thereto, according to the method of claim 1.

31. A system comprising:
a fluid conduit comprising optical fiber wrapped at least partially therearound, and secured relative thereto, according to the method of claim 1; and
an interrogator optically coupled to the optical fiber and operable to interrogate the optical fiber by sending one or more light pulses along the optical fiber and receiving reflections of the one or more light pulses from fiber Bragg gratings provided along the optical fiber.

* * * * *